(No Model.)

E. D. MEAD.
SEEDING MACHINE.

No. 289,296. Patented Nov. 27, 1883.

WITNESSES
Jas. F. DuHamel
Walter S. Dodge

INVENTOR
Edwin D. Mead,
by Dodge & Son,
Attys.

United States Patent Office.

EDWIN D. MEAD, OF SHORTSVILLE, NEW YORK.

SEEDING-MACHINE.

SPECIFICATION forming part of Letters Patent No. 289,296, dated November 27, 1883.

Application filed September 5, 1883. (No model.)

*To all whom it may concern:*

Be it known that I, EDWIN D. MEAD, of Shortsville, in the county of Ontario and State of New York, have invented certain Improvements in Seeding-Machines, of which the following is a specification.

This invention relates to grain-drills, seeding-machines, and like implements, and particularly to such as are constructed to permit the hoes or teeth to be shifted from a straight to a zigzag line; and the improvement consists in providing the adjusting-lever with a locking device of novel construction adapted to hold the hoes or teeth at various adjustments.

Figure 1:
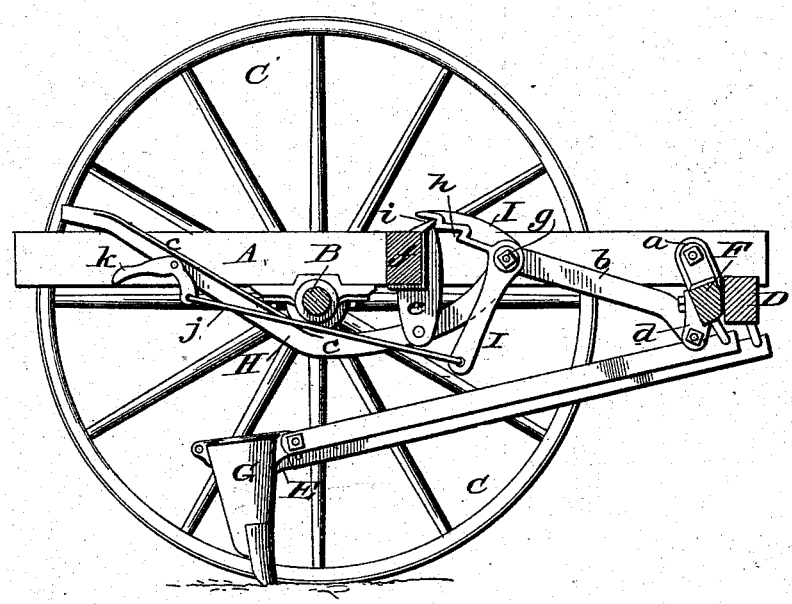
Figure 2:
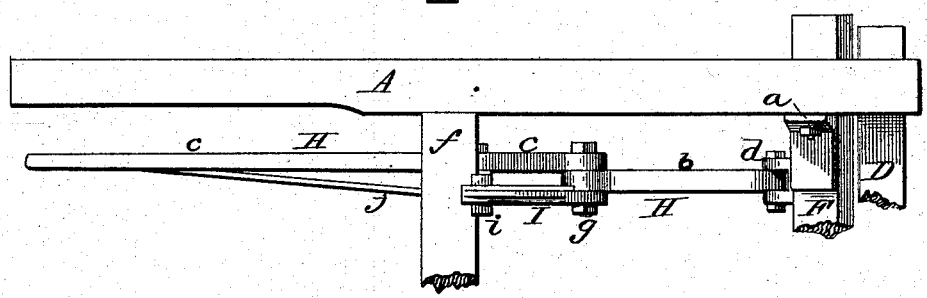
Figure 3:
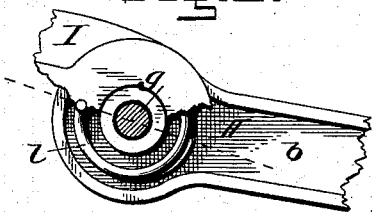
Figure 4:
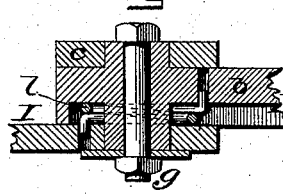

In the accompanying drawings, Figure 1 represents a side elevation of a grain-drill, showing the adjusting-lever and locking device; Fig. 2, a top plan view; Figs. 3 and 4, views illustrating details of constructions.

Although I have represented a grain-drill in the drawings, I wish it distinctly understood that the invention is equally applicable to cultivators, and hence in speaking of hoes or teeth I mean to be understood as including both drill and cultivator teeth.

In machines of this character as hitherto constructed provision has been made for but two adjustments of the hoes, one to bring the hoes into line, and the other throwing alternate hoes a considerable distance out of line. For many purposes the ordinary zigzag adjustment is so great as to materially injure the plants in the case of cultivators by throwing a large body of soil upon the alternate rows of plants by the rear hoes or teeth. Therefore they should be zigzaged as little as possible and clear themselves. To permit this range of adjustment, and in order to simplify and improve the shifting and locking mechanism, I construct the same as shown in the annexed drawings, in which—

A represents the frame of the machine; B, the ground-wheel axle, which is journaled therein or secured thereto, according to the character of the feeding devices used; C C, the ground-wheels, and D the front beam of the frame, to which the hoes E are attached in the ordinary manner.

F indicates a beam suspended by links or hangers, $a$, directly in rear of the front beam, D, and having attached to it the drag-bars of a second rank of hoes or drill-teeth, G, as shown in the drawings.

H represents an adjusting-lever, consisting of two parts, $b$ and $c$, the former jointed to a lug or casting, $d$, secured to the beam F, and jointed at its opposite end to the part $c$, which is pivoted in a block or hanger, $e$, bolted or otherwise firmly secured to the cross-beam $f$ of the main frame A, the hanger or block $e$ being carried upward in front of the beam $f$, and fashioned to receive a locking-dog, I, pivoted to the hand-lever H at the joint connecting the parts $b$ $c$ thereof. The dog I consists of a casting in the shape of an elbow-lever, the upper arm of which is provided with two or more shoulders or notches, $h$, to engage with the locking-shoulder $i$ of the block or casting $e$, the lower arm of the dog extending downward below the pivot $g$, and being connected by a rod, $j$, with a hand-piece, $k$, pivoted to the part $c$ of the hand-lever H in such position as to be readily grasped by the fingers in taking hold of the hand-lever to shift the beam F. By pressing the free end of the hand-piece $k$ against or toward the part $c$ of lever H, the dog I is thrown up out of engagement with the shoulder $i$ through the medium of the rod $j$ against the tension or action of a spring, $l$, encircling the pivotal bolt $g$, and having its ends seated, respectively, in the dog I and the part $b$ of the lever H. This spring tends to hold the dog I in engagement with the shoulder $i$, except when released therefrom by the hand of the operator pressing upon the hand-piece $k$.

By releasing the dog, in the manner above described, and bearing down upon the lever H, the beam F will be swung backward, and the hoes G, connected therewith, will accordingly be thrown rearward out of line with the hoes E, the extent to which they will be thrown out of line being dependent upon the movement of the lever H. If but a slight zigzag is desired, the lever will be moved so as to cause the intermediate shoulder or notch of the dog I to engage with the shoulder $h$; but if a greater amount of zigzag or shifting of the hoes is desired, the lever is thrown down until the body of the dog I, close to its pivot, comes into contact with the shoulder $i$. When it is desired that the hoes shall be in line, the lever is raised until the outermost shoulder or notch of the dog I engages with the shoulder $i$, as shown in Fig. 1, by which adjustment the hoes will be caused to stand in line with each other from one side of the machine to the other. Any desired number of notches may be made in the dog I, according to the variations of adjustment required. The two notches shown, together with the shoulder formed by the meeting of the two arms of the dog, will ordinarily be sufficient.

I am aware that it is not new to attach alternate hoes or drill-teeth, respectively, to a stationary and swinging beam, and to provide a lever for moving the swinging beam so as to throw the hoes into or out of adjustment; but, so far as I am aware, no means have hitherto been provided for automatically locking the swinging beam in its various adjusted positions.

Having thus described my invention, what I claim is—

1. In an implement, substantially such as herein described, the combination of a wheeled frame provided with a stationary beam and with a swinging beam, teeth or hoes alternately attached to the respective beams, and a hand-lever consisting of two parts jointed one to the other connected with the swinging beam and provided with a locking device, substantially as shown and described, whereby the teeth or hoes may be thrown into alignment or out of alignment to different degrees and held at any desired adjustment.

2. In combination with frame A, fixed beam D, and swinging beam F, teeth or hoes E G, connected with the respective beam, hand-lever H, consisting of the parts $b\ c$, the former connected with the beam F, and the latter pivoted to the beam $f$, and the locking-dog I, applied to the lever, substantially in the manner shown.

3. In combination with frame A, fixed beam D, and swinging beam F, hand-lever H, locking-dog I, and suspending block or casting $e$, provided with shoulder $i$, substantially as and for the purpose set forth.

4. In combination with the swinging beam F, of a shifting-rank implement, hand-lever H, pivoted to the main frame and connected with the swinging beam, dog I, provided with shoulders or notches $h$, pivoted to the hand-lever, hand-piece $k$, and connecting-rod $j$, extending from the hand-piece to the locking-dog, substantially as shown.

5. The combination, substantially as herein described, of frame A, fixed beam D, swinging beam F, hoes or teeth attached to the respective beams, hand-lever H, consisting of the parts $b$ and $c$, connected by bolt $g$, dog I, pivoted upon the bolt $g$, and provided with shoulders $h$, hand-piece $k$, and connecting-rod $j$, all combined and operating substantially as set forth.

6. In combination with the adjusting-lever H, of a shifting-rank implement, substantially as shown, a locking-dog, I, applied to said lever and provided with spring $l$, as and for the purpose set forth.

EDWIN D. MEAD.

Witnesses:
LATIMER ANDREWS,
HUGH FISH.